United States Patent [19]

Passaret

[11] 4,417,910
[45] Nov. 29, 1983

[54] PROCESS FOR MANUFACTURING A GLASS TUBE COMPRISING AT LEAST ONE DOPED SILICA LAYER

[76] Inventor: Michel Passaret, 20, rue Pierre Le Goffic, 22700 Perros Guirec, France

[21] Appl. No.: 302,145

[22] Filed: Sep. 14, 1981

[30] Foreign Application Priority Data

Sep. 17, 1980 [FR] France .................. 80 19986

[51] Int. Cl.³ .................. C03B 37/01; C03B 19/06
[52] U.S. Cl. .................. 65/3.12; 65/2; 65/18.2; 65/18.4; 65/17; 501/12
[58] Field of Search .................. 65/18.1, 18.2, 18.3, 65/18.4, 3.12, 71, 134, 17, 2; 501/12

[56] References Cited

U.S. PATENT DOCUMENTS

| | | | |
|---|---|---|---|
| 2,268,589 | 1/1942 | Heany | 65/18.2 X |
| 3,853,520 | 12/1974 | Rau | 65/71 |
| 3,853,521 | 12/1974 | Greenwood | 65/71 |
| 4,217,027 | 8/1980 | MacChesney et al. | 65/3.12 X |
| 4,235,616 | 11/1980 | Siegfried | 65/3.12 |
| 4,242,375 | 12/1980 | Shiraishi et al. | 65/3.12 X |
| 4,253,863 | 3/1981 | Iyengar | 65/3.12 |
| 4,263,032 | 4/1981 | Sinclair et al. | 65/3.12 |
| 4,314,837 | 2/1982 | Blankenship | 65/3.12 |

FOREIGN PATENT DOCUMENTS

| | | |
|---|---|---|
| 25230 | 3/1981 | European Pat. Off. . |
| 2447353 | 4/1976 | Fed. Rep. of Germany . |
| 2545273 | 4/1977 | Fed. Rep. of Germany . |
| 2638991 | 3/1978 | Fed. Rep. of Germany . |
| 2429040 | 1/1980 | France . |
| 56-37234 | 4/1981 | Japan .................. 65/18.1 |

*Primary Examiner*—Kenneth M. Schor
*Attorney, Agent, or Firm*—Michael N. Meller

[57] ABSTRACT

A process for manufacturing a glass tube, comprising at least one doped silica layer, wherein the layer is formed by forming a gel in situ, by the atomization of a hydrolyzing agent, onto a layer of a gelable liquid containing an alkoxy silane on a cylindrical mandrel rotated in a centrifuge, the gelable liquid and/or hydrolyzing agent containing a doping element, whereafter the resulting gel layer is subjected, after the withdrawal of the mandrel, to at least one thermal treatment to dry the gel and convert it into doped vitreous silica. The process can be applied to the production of preforms for the manufacture of optical fibers.

17 Claims, 1 Drawing Figure

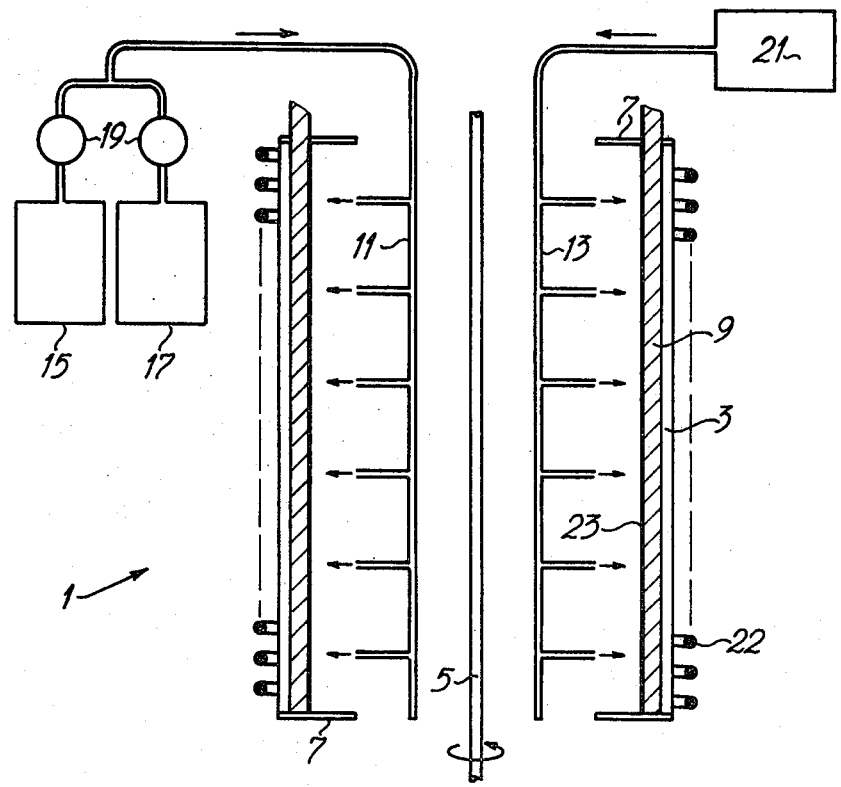

PROCESS FOR MANUFACTURING A GLASS TUBE COMPRISING AT LEAST ONE DOPED SILICA LAYER

The invention relates to a process for the production of a glass tube comprising at least one doped silica layer which can be used inter alia for making preforms for monomode or multimode optical fibers, with a jump in index or an index gradient, of cylindrical lenses and more generally light guides.

BACKGROUND OF THE INVENTION

For a number of years much research work has been carried out in the field of producing optical wave guides, since these are very advantageous in optical telecommunication systems because of their high transmitting capacity.

These wave guides or optical fibers comprise a glass sheath and a glass core having a reflective index higher than that of the sheath. When the fibers are monomode fibers the core has a constant composition. In contrast, in the case of multimode optical fibers the composition of the core varies radially either in stages or continuously.

The known processes for producing monomode and multimode fibers, with a jump in index or an index gradient, use either glass-making methods or high temperature deposition methods.

Amongst the methods using glass-making techniques, French Pat. No. 2.368.444 illustrates a process which consists in forming a blank of the future fiber, whereafter the blank is subjected to a purification treatment comprising a number of stages, including a separation into two solid phases and a washing of the phase which collected the majority of the impurities; after the purification treatment, the fiber is obtained by drawing the blank. However, that process has the disadvantage of resulting in optical fibers generally having fairly high losses, an ill-defined core-sheath interface and an index profile which is difficult to control, and therefore average or mediocre transmission bands. The process also requires considerable purification of the starting products, and this raises certain problems, since such products are in the solid state and are therefore difficult to purify and handle without pollution.

The methods using high temperature deposition techniques for doped silica layers, for example, the known processes for deposition by flame hydrolysis, such as those illustrated in French Pat. Nos. 2.088.486 and 2.178.175, or processes of deposition in the vapor phase have the disadvantages of being expensive, requiring high temperatures, generally above 1400° C., and producing only fibers of limited length.

Moreover, those methods have certain difficulties of performance as regards mastering the index profile of the layers deposited. Further, they always have a yield lower than that of 1, and require the use of a glass or silica support.

The invention relates more particularly to a process for manufacturing a glass tube comprising at least one doped silica layer which enables preforms to be obtained which can be used for the manufacture of monomode or multimode optical fibers, with a jump in index or an index gradient, while obviating the disadvantages of the known processes.

SUMMARY OF THE INVENTION

The invention provides a process for manufacturing a glass tube comprising at least one doped silica layer, wherein the layer is formed by forming a gel in situ, by the atomization of a hydrolyzing agent onto a layer of a gelable liquid containing an alkoxysilane on a cylindrical mandrel rotated in a centrifuge, the gelable liquid and/or hydrolyzing agent containing a doping element, whereafter the resulting gel layer is subjected, after the withdrawal of the mandrel, to at least one thermal treatment to dry the gel and convert it into doped vitreous silica.

According to the invention the gel layer is formed in situ by atomizing simultaneously or successively the gelable liquid and the hydrolyzing agent on the wall of the cylindrical mandrel rotated around its axis in a centrifuge.

By operating in this way, the composition of the gelable liquid and/or the hydrolyzing agent atomized onto the mandrel can be suitably varied continuously or intermittently in such a way as to form on the mandrel either a gel layer whose composition varies radially and continuously, or a number of gel layers having different contents of doping element. After thermal treatment, hollow tubes can thus be obtained which are relatively large and can be converted into preforms capable of supplying several tens to several hundreds of kilometers of optical fibers.

The process according to the invention therefore has numerous advantages over the prior art processes, since the raw materials used are gelable liquids containing alkoxysilanes, fluorinated alkoxysilanes or alkoxygermanes, which can easily be brought to a high degree of purity. Moreover the depositing operation is carried out at ambient temperature, and the composition of the deposited layers can readily be controlled by acting solely on the doping element content of the gelable liquid and/or hydrolyzing agent. Lastly, the fact that gels are used enables particularly smooth and very high quality interfaces to be obtained.

BRIEF DESCRIPTION OF THE DRAWING

The drawing shows diagramatically in vertical section a device for the performance of the process according to the invention.

DETAILED DESCRIPTION

According to the invention the doping element, which can be formed by a compound of germanium, titanium, aluminum fluorine, or phosphorus, is introduced into the gelable liquid and/or the hydrolyzing agent.

When the doping element is present in the gelable liquid, the latter is advantageously formed by a mixture of an alkoxysilane and an alkoxygermane, or by a mixture of an alkoxysilane and a fluorinated alkoxysilane. In that case the hydrolyzing agent can be formed by an acid aqueous solution, such as a solution of hydrochloric acidic, preferably having a pH substantially equal to 1, or by a basic aqueous solution, such as ammonia, preferably having a pH of about 11.

When the doping element is present in the hydrolyzing agent the gelable liquid comprises an alkoxysilane, or the hydrolyzing agent used is an aqueous solution containing fluoride ions, for example, an acid solution having a pH substantially equal to 1, such as a solution of hydrofluoric acid and ammonium fluoride. In that case use can also be made of a basic solution having a pH substantially equal to 11, containing fluoride ions, for example, a solution of ammonia containing ammonium fluoride.

In all cases, when the gelable liquid is brought into contact with the hydrolyzing agent, a gel is formed by a polycondensation reaction.

The material can then be converted into vitreous silica by a thermal pyrolysis treatment. Since in a gel the particles are very small, the porosity of the gel layer remains low during the thermal treatment, and this facilitates the vitrification operation. When the starting gelable liquid and/or hydrolyzing agent contain a doping element, such as germanium or fluorine, doped vitreous silica is obtained.

Preferably according to the invention the alkoxysilane used is tetraethoxysilane; and when the doping element is present in the gelable liquid it is introduced in the form of tetraethoxygermane or tetra (2-fluoroethoxy) silane.

However, use can be made of other alkoxysilanes and alkoxygermanes, more particularly those whose alkoxy radicals have 1-4 carbon atoms.

After forming on the rotated cylindrical mandrel a gel layer whose composition varies radially or a succession of gel layers of different compositions, each layer is subjected to a thermal treatment with a view to ensuring first their drying, then their vitrification (thermal consolidation), after the auxiliary mandrel has been withdrawn. Preferably the thermal treatment is carried out in two stages, the first stage being performed at a temperature of 150°-200° C. and the second stage at a temperature of 700°-1050° C. To accelerate drying, advantageously the first stage of the thermal treatment is performed under centrifugation, using speeds of rotation slightly higher than those used during the deposition of each gel layer.

In a variant performance of the process according to the invention the second stage of the thermal treatment is performed in a dehydrating atmosphere, preferably a halogenated atmosphere comprising, for example, chlorine or thionyl chloride, so as to complete the elimination of the water and hydroxy ions.

The hollow glass tubes comprising at least one doped silica layer thus obtained can be converted into preforms which can be used for the manufacture of optic fibers. In that case, the hollow glass tube thus obtained is subjected to a reducing operation carried out in conventional conditions, such as those normally used for converting into preforms tubes obtained by depositing a core glass inside a sheath tube.

In that case, the hollow glass tube is heated to a temperature at which each glass layer has a viscosity low enough for it to be able to collapse, so as to reduce its diameter until the longitudinal hole is closed. In this way a preform is obtained which can then be converted into optical fibers by a complementary drawing operation performed by conventional techniques.

Other features and advantages of the invention will be more clearly gathered from the following non-limitative merely exemplary description with reference to the accompanying drawing.

The device is formed by a vertical centrifuge 1 comprising a perforated cylindrical basket 3 which can be rotated around its axis by a shaft 5 and which has at its two ends flanges 7 which can accommodate a cylindrical mandrel 9.

The device also comprises a first series of nozzles 11 and a second series of nozzles 13 extending vertically on either side of the shaft 5. The first series of nozzles 11, by means of which the gelable liquid can be atomized onto the mandrel 9, is connected to two reservoirs 15 and 17, containing a gelable compound which is a precursor of silica and a doping element respectively, via two conduits each having a metering pump 19, enabling the doping element content of the gelable liquid atomized onto this support 9 to be controlled to the required value and varied as a function of time.

The second series of nozzles 13, via the hydrolyzing agent can be atomized onto the support 9, is connected to a reservoir 21, containing the hydrolyzing agent.

The device also comprises heating elements 22 which are distributed around the rotary basket 3.

To produce, according to the invention, a hollow glass tube comprising at least one doped silica layer, the device is used in the following manner.

The auxillary mandrel 9 comprising, for example, a plastic cylinder is disposed inside the centrifuge.

Then the basket 3 and the mandrel 9 are rotated, and the gelable liquid is atomized onto the mandrel 9 by means of the first series of nozzles 11, while suitably controlling its content of alkoxysilane and doping agent comprising, for example, an alkoxygermane. In this way, under the action of centrifugal force, the atomized gelable liquid is retained on the mandrel in the form of a thin layer 23. The liquid layer is then converted into a gel in situ by atomizing onto the liquid layer, by the series of nozzles 13, the hydrolyzing agent comprising, for example, an aqueous solution of hydrochloric acid having a pH substantially equal to 1. After the gelation of the layer 23, the first series of nozzles 11 is used again to atomize gelable liquid, namely a mixture of alkoxysilane and alkoxygermane, and the composition of the mixture is varied to form continuously a gel layer whose composition varies radially. Simultaneously the second series of nozzles 13 is used to atomize hydrolyzing agent so as to gel continuously the gelable liquid retained on the mandrel. When the gel layer thus formed has reached the required thickness, the introduction of gelable liquid and hydrolyzing agent is interrupted, and then the gel layer is subjected to a thermal treatment preferably performed in two stages.

First of all the mandrel is withdrawn, and then the centrifuge is heated by elements 22 to a temperature lying between 150° and 200° C., while rotating the cylinder of gel 23 so as to accelerate drying by centrifugal force and thus eliminate the major part of the water.

The cylinder of dried gel thus obtained is then subjected to a vitrification treatment carried out in a different furnace, which is progressively heated to a temperature of about 800° C.

Advantageously, to complete the elimination of the last traces of water and hydroxy ions, the vitrification treatment is carried out in a halogenated atmosphere, for instance, in an atmosphere containing chlorine or thionyl chloride. The result is a cylinder of doped silica. The cylinder is then subjected to a collapsing operation to obtain a preform which can be used for the manufacture of optical fibers. The collapsing operation is performed by conventional methods, for example, by heating the hollow tube in a furnace or by means of a torch so as to crush the longitudinal hole and thus obtain a preform for the manufacture of optical fibers.

The preform can then be subjected to a drawing operation to be converted into an optical fiber by a conventional technique.

Although this example describes the preparation of a hollow tube whose composition varies radially and continuously, clearly according to the invention a tube can also be obtained whose composition varies radially in stages. In that case a layer of gelable liquid of predetermined composition is deposited on the mandrel, and the layer is gelled; then the composition of the gelable liquid introduced into the centrifuge is modified in stages, and the hydrolyzing agent continues to be introduced, so as to deposit successively a plurality of doped silica gel layers whose content of doping element varies from one layer to the other.

A fluorinated alkoxysilane can also be substituted for the alkoxygermane, or fluoride ions can be introduced into the hydrolyzing agent. The following is an example of the performance of the process according to the invention to produce a preform comprising a pure silica sheath and a germanium-doped silica core whose composition varies radially.

First of all the sheath is formed by atomizing in the centrifuge onto the mandrel 9, which has a diameter of 35 cm. and a height of 100 cm., 48 l. of tetraethoxysilane, which is continuously hydrolyzed by means of 48 l. of hydrochloric acid solution with a pH of 1 atomized by the nozzles 13. After the gelation of the first layer, which will form the sheath of the future fiber, the nozzles 11 introduce into the centrifuge a mixture of tetraethoxysilane and tetraethoxygermane of a total volume of 16 l. which is continuously gelled by means of 13 l. of hydrochloric acid solution having a pH of 1, the composition of the mixture of ethoxysilane and the ethoxygermane being varied from 1 to 0.88. The amounts of gelable liquid and hydrolyzing solution are controlled to a mean value of 250 cm$^3$/mm, enabling gelation to be performed in about 4 hours. The mandrel 9 is then withdrawn, and the centrifuge is heated by the element 22 to a temperature of about 160° C., and the previously obtained gel cylinder continues to be rotated for 5 hours, enabling the major part of the solvents to be extracted. After this operation the dry gel cylinder is heated to a temperature of 800° C. for 2 hours in a chlorine atmosphere, and then the tube obtained is subjected to a collapsing operation performed at a temperature of about 1500° C. The result is a bar of 20 kg comprising a pure silica sheath and a germanium-doped silica core whose germanium content varies radially. The bar can then be converted into optical fibers by conventional drawing techniques.

What is claimed is:

1. A process for manufacturing a glass tube comprising at least one doped layer which process comprises the following steps:

atomizing onto the inside surface of a cylindrical mandrel rotated in a centrifuge, a gelable liquid containing an alkoxysilane so as to form on the mandrel, a layer of said gelable liquid;

simultaneously atomizing on said layer a hydrolyzing agent to convert the layer of gelable liquid to a layer of gel; with the hydrolyzing agent and/or the gelable liquid containing a doping element;

withdrawing the mandrel from the centrifuge, with the layer of gel remaining in the centrifuge; and submitting the layer of gel thus obtained to at least one thermal treatment, to dry and thermally consolidate the layer into a tube of doped vitrious silica.

2. The process according to claim 1, wherein the gelable liquid comprises a mixture of an alkoxysilane and an alkoxygermane.

3. The process according to claim 1, wherein the gelable liquid comprises a mixture of a fluorinated alkoxysilane and an alkoxysilane.

4. The process according to claim 2 or 3 wherein the hydrolyzing agent is an acidic aqueous solution having a pH substantially equal to 1.

5. The process according to claim 2 or 3, wherein the hydrolyzing agent is a basic aqueous solution having a pH substantially equal to 11.

6. The process according to claim 1, wherein the gelable liquid is an alkoxysilane, and the hydrolyzing agent is an aqueous solution containing fluoride ions.

7. The process according to claim 6, wherein the aqueous solution is an acidic solution having a pH substantially equal to 1.

8. The process according to claim 6, wherein the aqueous solution is a basic solution having a pH substantially equal to 11.

9. The process according to claim 2, wherein the alkoxysilane is tetraethoxysilane.

10. The process according to claim 3, wherein the fluorinated alkoxysilane is tetra (2-fluoroethoxysilane).

11. The process according to claim 2, wherein the alkoxygermane is tetraethoxygermane.

12. The process according to claim 1, wherein the composition of the gelable liquid and/or the hydrolyzing agent atomized onto the mandrel is varied continuously so as to form a gel layer whose composition varies radially.

13. The process according to claim 1, wherein the thermal treatment is performed in two stages, the first stage being performed at a temperature of 150°–200° C., and the second stage being performed at a temperature of 700°–1050° C.

14. The process according to claim 13, wherein the first stage of the thermal treatment is performed under centrifugation.

15. The process according to claim 13 or 14, wherein the second stage of the thermal treatment is performed in a dehydrating atmosphere.

16. The process according to claim 15, wherein the dehydrating atmosphere comprises chlorine or thionyl chloride.

17. A process for the production of a preform which can be used for the manufacture of optical fibers wherein a hollow glass tube comprising at least one doped silica layer is prepared by the process according to claim 1, the resulting hollow glass tube being subjected to a collapsing operation.

* * * * *